(No Model.) 5 Sheets—Sheet 2.
W. H. FORD.
CONDUIT SYSTEM FOR ELECTRIC RAILWAYS.
No. 478,956. Patented July 12, 1892.
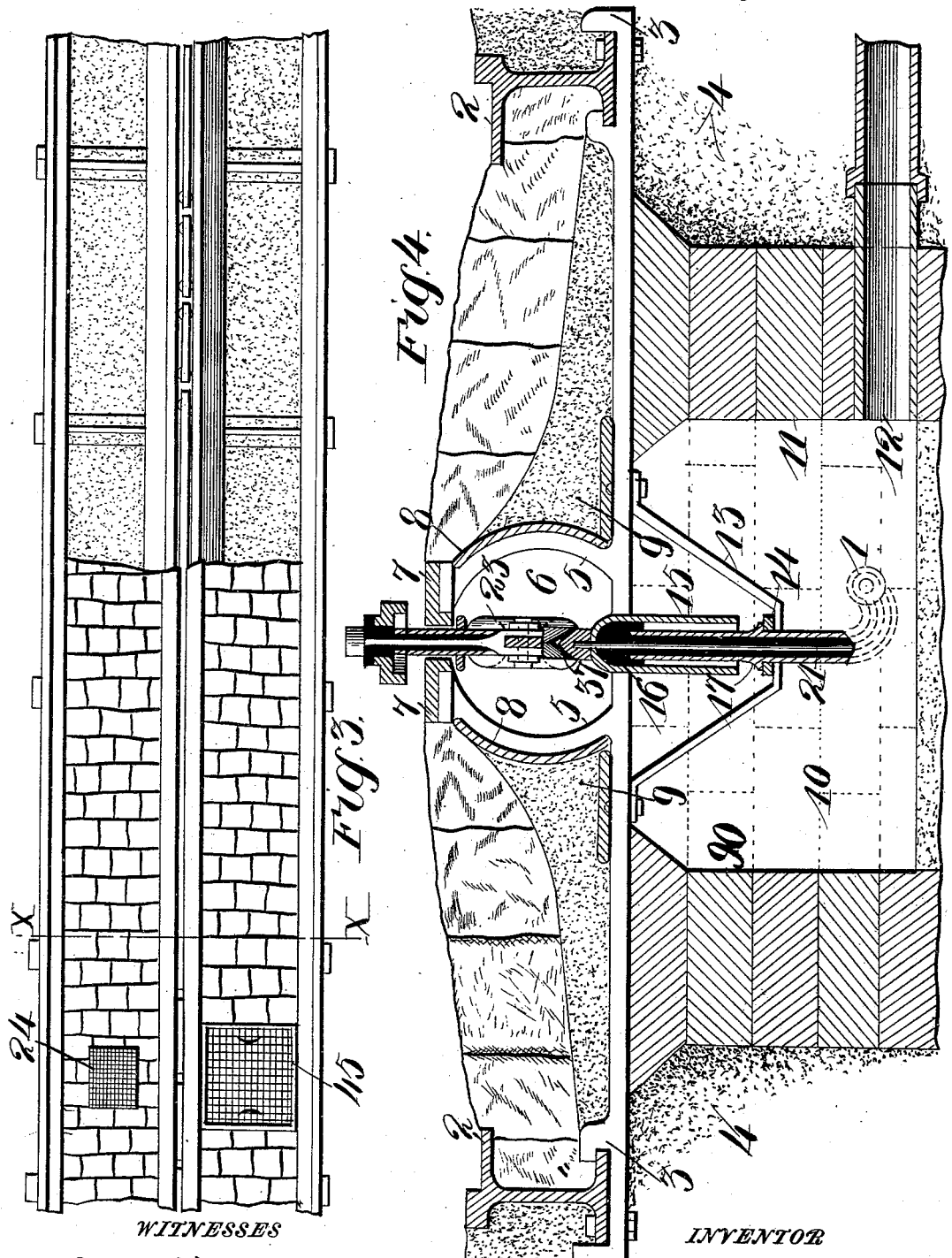
WITNESSES
INVENTOR
William H. Ford.
By Higdon & Higdon Attorneys.

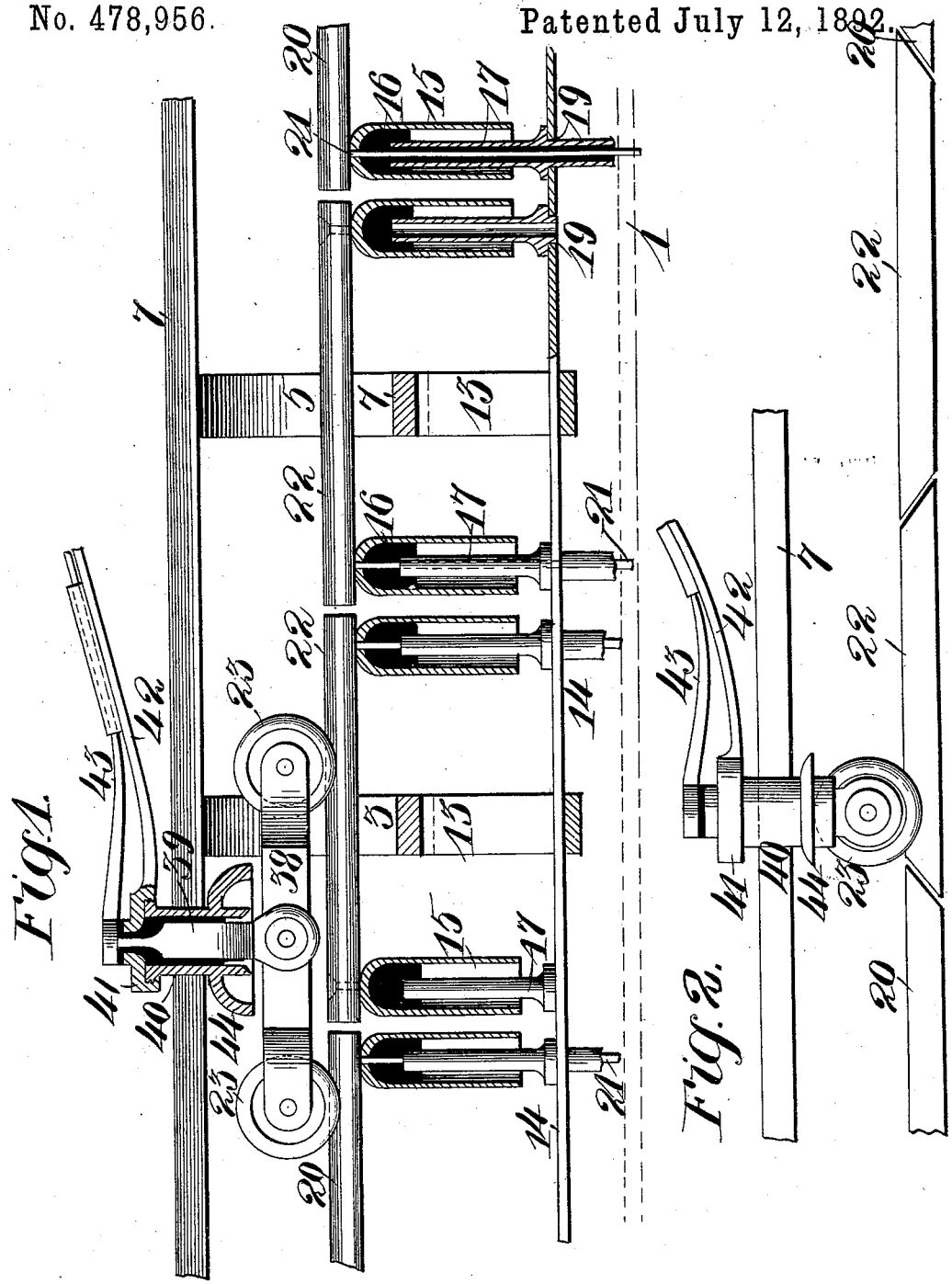

(No Model.) 5 Sheets—Sheet 3.

W. H. FORD.
CONDUIT SYSTEM FOR ELECTRIC RAILWAYS.

No. 478,956. Patented July 12, 1892.

WITNESSES
INVENTOR
William H. Ford.
by Higdon & Higdon Attorneys.

(No Model.) 5 Sheets—Sheet 4.

W. H. FORD.
CONDUIT SYSTEM FOR ELECTRIC RAILWAYS.

No. 478,956. Patented July 12, 1892.

WITNESSES

INVENTOR
William H. Ford.
by Higdon & Higdon Attorneys.

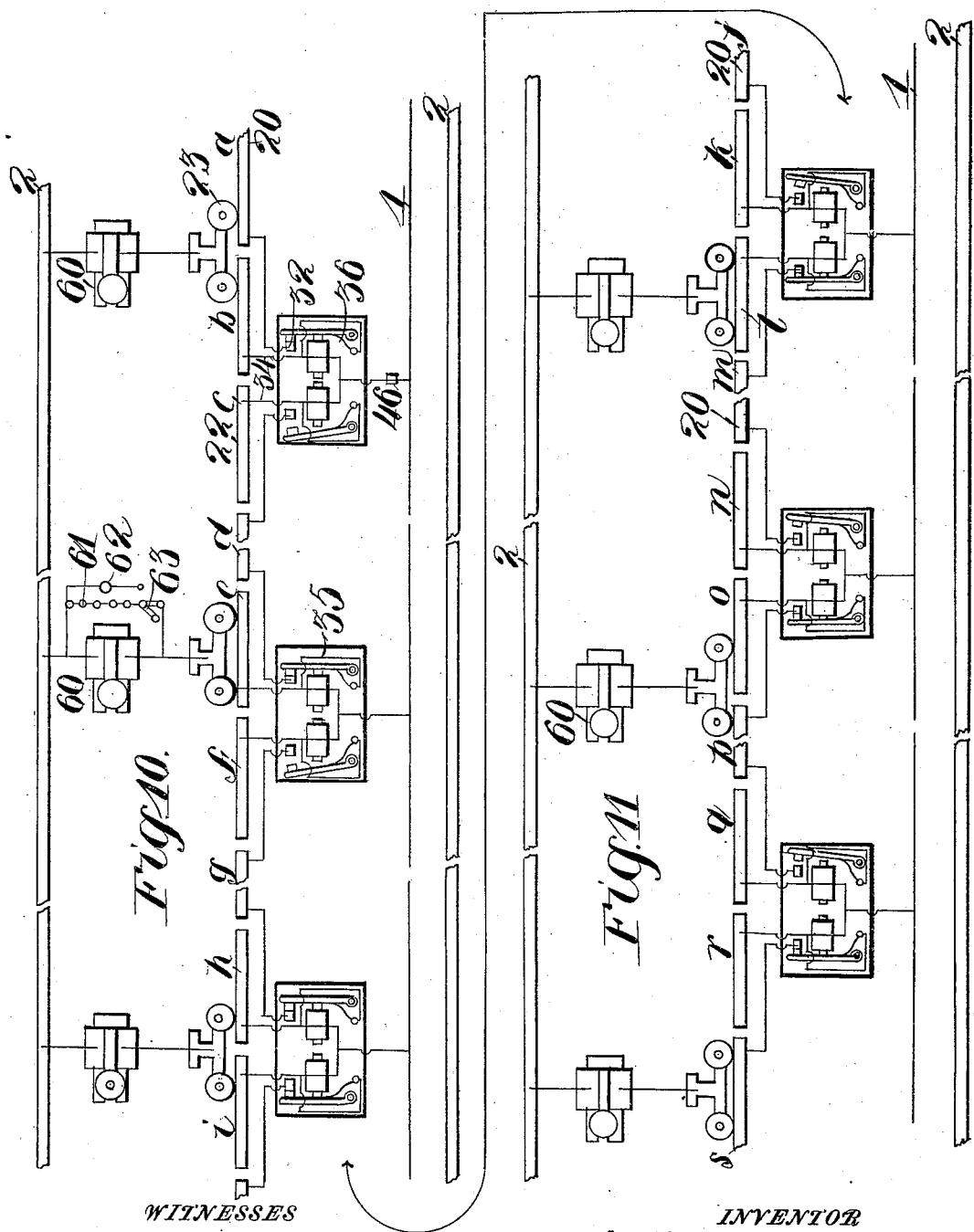

UNITED STATES PATENT OFFICE.

WILLIAM H. FORD, OF ST. LOUIS, MISSOURI, ASSIGNOR OF ONE-HALF TO WILLIAM A. STICKNEY, OF SAME PLACE.

CONDUIT SYSTEM FOR ELECTRIC RAILWAYS.

SPECIFICATION forming part of Letters Patent No. 478,956, dated July 12, 1892.

Application filed July 6, 1891. Serial No. 398,516. (No model.)

*To all whom it may concern:*

Be it known that I, WILLIAM H. FORD, of the city of St. Louis and State of Missouri, have invented certain new and useful Improvements in Conduit Systems for Electric Railways, of which the following is a full, clear, and exact description, reference being had to the accompanying drawings, forming a part hereof.

This invention relates to an improvement in conduit-systems of electric railways; and it consists in the novel combination and arrangement of devices hereinafter set forth and claimed.

Figure 6:
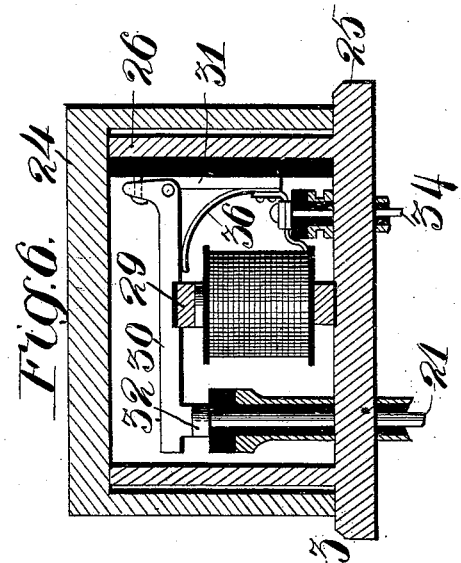
Figure 8:
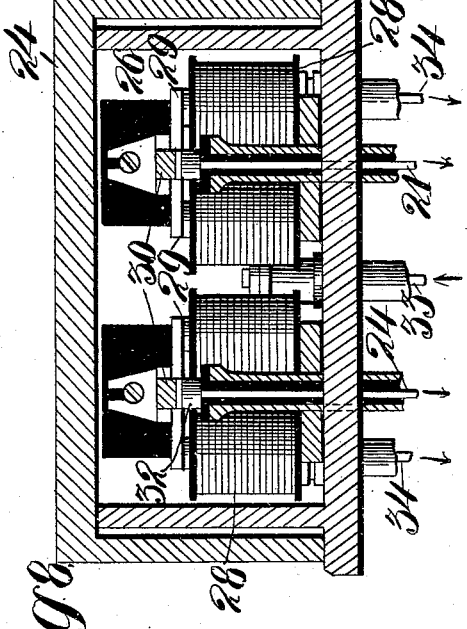
Figure 5:
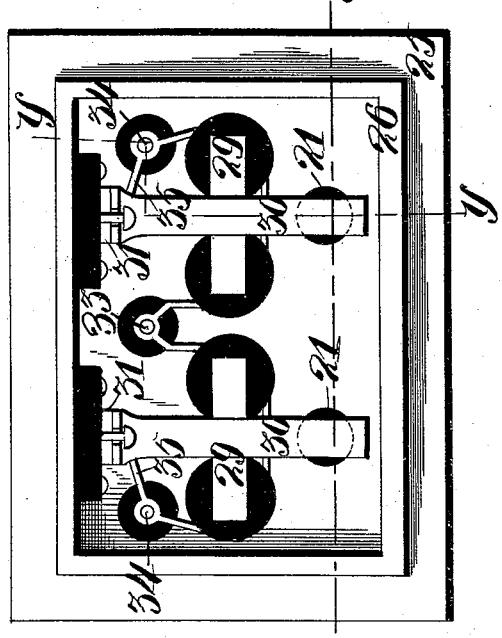
Figure 7:
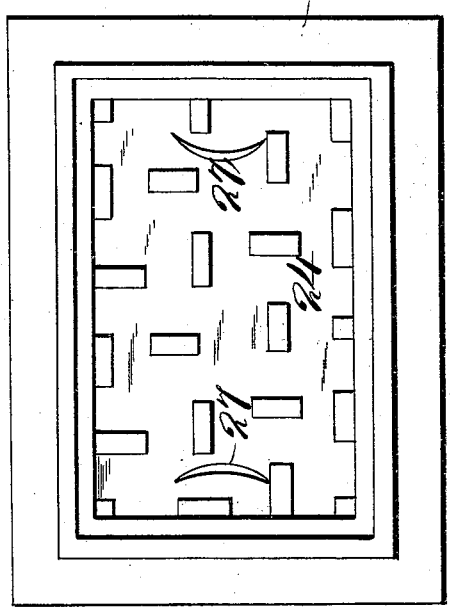
Figure 9:
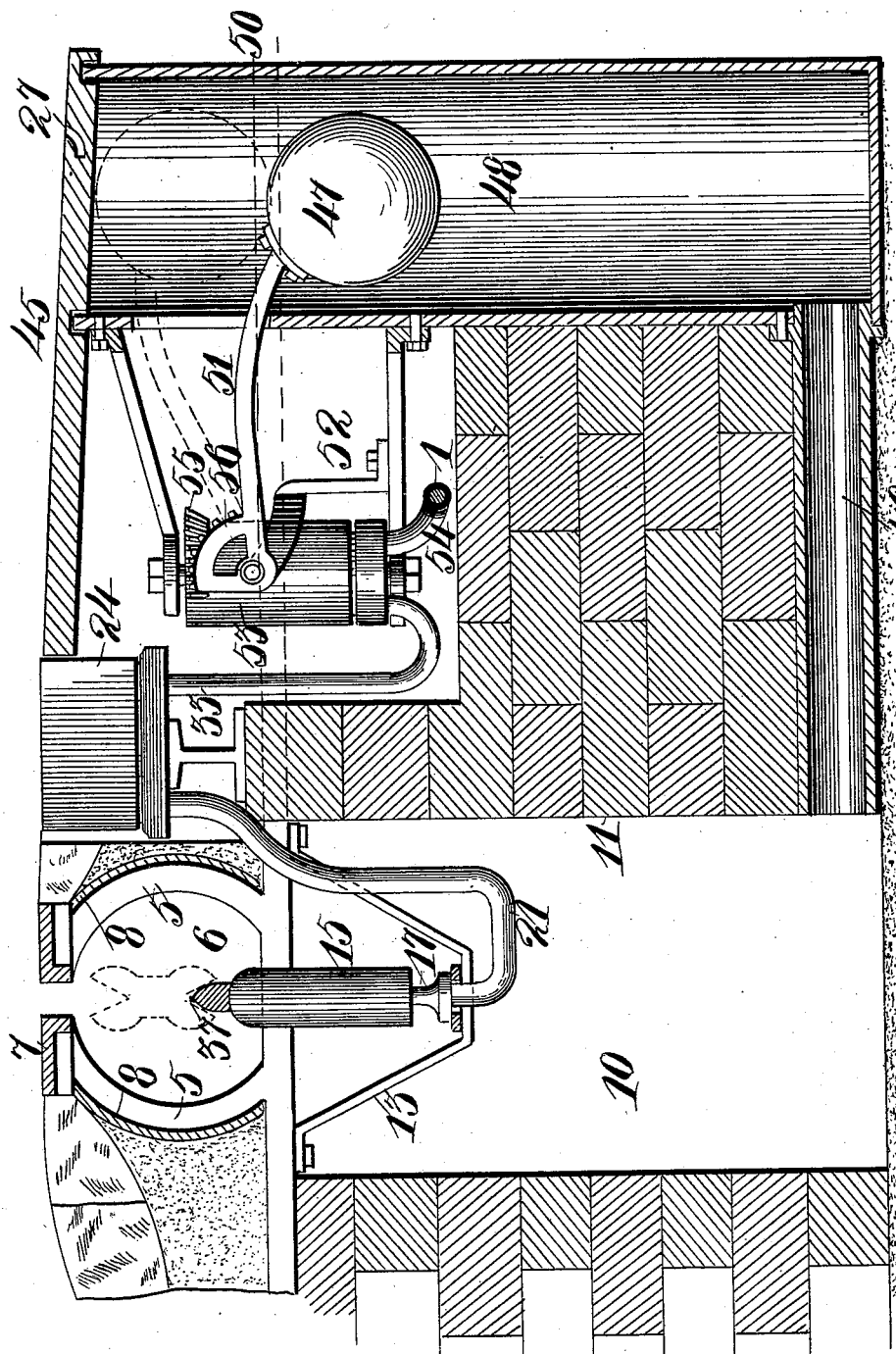

In the drawings, Figure 1 is a longitudinal vertical section of the parts located in the conduit, portions being shown in elevation. Fig. 2 is a detail view of a modified form of trolley, also showing a modified construction of the adjacent ends of the sections and subsections of the bare conductor. Fig. 3 is a plan view, reduced in size and with parts broken away, showing the roadway. Fig. 4 is a transverse section through the roadway and conduit on line *x x* of Fig. 3. Fig. 5 is a plan view of a "pneumatic" switch-box with the cover removed therefrom. Fig. 6 is a section through the same on line *y y* with the cover in place thereon. Fig. 7 is a plan view of same with cover on. Fig. 8 is a longitudinal section through a pneumatic switch-box on the line *z z* of Fig. 5. Fig. 9 is a transverse section through the roadway, showing the "hydraulic" cut-out and the connections between the main conductor and the bare conductor. Fig. 10 is a diagram illustrating the construction of the electric devices forming part of my invention. Fig. 11 is a similar view, it being a continuation of Fig. 10.

Heretofore electric railways have been constructed in accordance with several different systems, among which I may enumerate the following: first, those wherein a bared overhead conductor is employed; second, those which are operated by a conducting-rail (continuous or sectionalized) or spots resting or laid upon the surface of the ground, and, third, those in which a conductor is placed in a slotted conduit, communication for the current being effected by means of a sliding or rolling current-collector and appropriate electrical contrivances. In the first of these systems an "overhead" conductor devoid of sections is not free from objections which are well known and need not be detailed here. In the second of these systems those in which a conductor (or spots) is laid upon the surface of the ground, the difficulties attending proper insulation are great, and the dissipation of current therefrom by "film" conduction in wet weather and by electrolysis render it quite costly to operate such system in rain and floods.

I have found it necessary to place the bare conductor beneath the surface and to arrange the connections thereof in a peculiar manner, as will be hereinafter described, so that accidental contact with such conductor by man or beast shall be impossible, thus eliminating all elements of danger, and it is to this last-named class of electric railways that my invention relates.

Heretofore I have not found it practicable to operate an electric railway of this character, having a continuous bare conductor, except in dry weather, in consequence of the usual dampness of the earth, the passage of water through the slot of the conduit, (which slot is indispensable,) and the accumulation of bodies of water in the conduit during heavy rains and floods, which latter fills up the conduit and overflows the bare conductor, envelops contacts, and thereby more or less dissipates currents and short-circuits the dynamo. Breaking up the bare conductor into sections (which are brought at proper times into circuit with an insulated main conductor) in part obviates the difficulties attending dampness and rains; but exposed sections of a bare conductor permanently in electrical continuity with the main conductor would, if extensive and wholly submerged, dissipate a very large quantity of current, all of which is well known to those skilled in electric-railway construction. Likewise in this last-named situation as long as a flood lasts this loss must continue, and even when it subsides the bared conductor and its supports are left (as after a heavy rain) covered with adhering wetness, and therefore adapted to dissipate a certain quantity of current, which traverses the adhering film of water upon the parts.

If we assume that such floodings shall not occur (and they may be very readily prevented by proper drainage,) the above-mentioned losses will be eliminated wholly if loss by moisture or by precipitation, due to varying temperatures, is prevented by the use of suitably-devised devices, which I will presently describe.

It is found that underground conduits of the class hereinbefore mentioned are always more or less damp from film conduction in heavy rains, the escape of water from watering-carts, fire-engines, bursting of water-mains, &c.

The object of this invention, therefore, is in the first place to avoid loss of current by film conduction, and this result I accomplish by novel means, whereby the insulation used in a conduit to support a bare conductor (or sections thereof) may be kept permanently dry both during rains and floods.

A further object is to limit the loss of current due to precipitated moisture in an underground conduit, wherein either a continuous or sectionalized bare conductor is employed.

A further object is to provide means whereby a sectionalized bare conductor in a conduit may be thrown into and cut out of the motor-circuit as the vehicle moves along without the usual electro-mechanical switches. In fact, the further object is to utilize smaller sections or "sub-sections" of the sectionalized conductor both as a rail upon which the current-collector shall slide or roll and as "contacts" through which the current shall pass and be transmitted to the section proper next in advance (as regards the motion of the vehicle) and thence to the motor.

A still further object is to provide means whereby the electro-mechanical switches and contacts thereof used about an electric railway, whether they be located in the roadway, in the street outside of the roadway, or in the conduit, may be kept dry.

A still further object is to provide an electric railway with a "hydraulic cut-out," whereby the section or sections of a bare conductor adjacent the bottom of a hill or incline will be automatically cut out when water rises in the conduit and automatically thrown in after the flooding has subsided, all of which will be further and more fully described hereinafter.

1 indicates the main conductor, which of course is to be perfectly insulated and connected at one end with the dynamo at the generating-station, and which extends throughout the length of the road on which cars are to be run. This conductor is located within a novel form of conduit (now to be described) or otherwise placed beneath the surface of the ground parallel with and between the track-rails 2.

The road may be built with either a single or double track; but for the present purpose I shall describe it as arranged for a single track, upon which a car may run in either direction. The track-rails 2 are laid upon preferably metallic cross-ties 3, seated upon a foundation 4 of concrete. Rising from near the central portion of the length of the cross-ties 3, and preferably cast integral therewith, are two vertical arms 5, which are curved to form the shape of the interior of the upper conduit 6, which carry on their upper ends the removable slot-rails 7, and which vertical arms 5 on each cross-tie are located at such distance apart as will provide the upper conduit 6 of suitable size to permit running therein a small trolley-wheel. Said conduit may not be more than six inches by eight inches in cross-section and have its sides formed by plates 8 of sheet metal extending from one cross-tie to another, (or concrete wall so extending.) The vertical arms 5 are braced against outward spreading by means of longitudinal ribs 9, formed integral with the bodies of the cross-ties or formed of concrete and resting upon said cross-ties in such a manner as to form braces for said vertical arms 5. (See Figs. 4 and 9.)

I have found that a very effectual safeguard against the effects of flooding is adequate drainage of the conduit, and for carrying out this purpose I form beneath the roadway and beneath and freely communicating with the upper conduit 6 a second and larger conduit 10, having sufficient size to admit of persons moving about therein during cleaning thereof, being walled on either side with masonry, such as 11, which is adapted to form a support for the framework of the roadway. The lower conduit 10 is provided at proper intervals with lateral drainage-tubes 12, (see Fig. 4,) which should communicate with the lowest portions of the lower conduit 10 and discharge into a convenient sewer or other receptacle for such matters, and these drainage-tubes should be of adequate capacity to carry off all water coming from above or running in through the slot, so as to effectually prevent accumulation of water in the conduits and consequent envelopment thereby of the bare conductor. However, in case of accidental clogging of the lateral drains 12 all accidental grounding of the line by reason of the submerging of the bare conductor will be prevented by my newly-invented hydraulic cut-out, which will be described farther on hereinafter. It will be observed that the cross-ties 3 extend across or "bridge" the lower conduit, and from these ties depend hangers 13, which are substantially \\_/-shaped, which have their free ends bolted or otherwise attached to the cross-ties, and a metallic supporting-plate 14 is mounted in or upon the lower portion of these hangers so as to extend parallel with but at some distance below the line of bare conductor or sections of bare conductor contained within the upper conduit.

15 indicates a series of what I term (in a conduit electric railway) "pneumatic chambers," consisting of a metallic shell (or a shell made of any other suitable material) having a closed water-tight upper end or portion containing a permanent body of insulating material 16 and having a lower end or mouth which is always open to the atmosphere or liquids which may rise in the conduit. These "pneumatic insulating-chambers" are adapted to act on the principle of a "diving-bell." Vertical pins 17, which may be either solid or tubular, are fixed upon the supporting-plate 14 or have their lower ends suitably fashioned and passed through apertures 19, formed at intervals in said plate, and the block, of insulation 16, carrying the said pneumatic insulating-chambers, are centrally mounted upon the upper ends of said pins, and the bare conductor 20 (or the sections and sub-sections thereof) is securely mounted upon the upper closed air and water-tight upper ends of said chambers 15, whereby said chambers are supported in the pathway of current-leakage (in a conduit) and water coming from above is caused to pass off at the lower edges of the shell inclosing said chambers and water or moisture coming from below is prevented from entering into the cavity of said chambers (beyond a certain limited distance regulated by the depth and upward pressure of the water) by the elastic resistance or downward elastic pressure of the air contained within the cavities of said chambers. In other words, a body of insulating material, as 16, is interposed between the bare conductor in a conduit and the metallic supporting-pins and plates by which said conductor is maintained in position, and said body of insulating material is covered and inclosed by a vertical chamber having a water and air tight upper portion for containing said body of insulating material and supporting it at the highest point within the chamber. The length of the pins 17 and the relative adjustment of the chambers 15 thereupon are such that the lower open ends of said chambers shall be some distance above the uppermost surface of the supporting-plates 14, and the bare conductor (or sections of bare conductor) may or may not be insulated from the upper ends of the shells of said chambers, upon which they rest.

For electrically connecting the bare conductor to the main conductor 1 I provide insulated feed-wires 21, which connect with the said main conductor and are run up through the tubular pins 17 and are connected to said bare conductor. (See Figs. 4 and 9.) The bare conductor is to be connected to the main conductor in multiple arc or other desirable and operative manner, which is well known and need not be further described.

At suitable points along the road (determined by the declivity and liability thereof to overflow or flooding) I provide two short sub-sections 22 22, (of bare conductor,) the adjacent ends of which are separated electrically and the opposite ends of which are separated from the longer sections 20. These sub-sections are in alignment with the longer sections and adapted to act as a rail for a double-flanged trolley-wheel or a trolley having two wheels, as 23, and they are of the same or similar form in cross-section, which may be that here shown—a $\wedge$-shaped form—or the said bare conductor may be the well-known rectangular form or have a rounded head or upper surface, and the adjacent ends of the sections 20 and sub-sections 22 are preferably beveled or angled to form a peculiar lap-joint, the purpose of which will appear farther on.

The length of the sub-sections 22 (each of them) is not greater than, say, ten to fifteen inches. They are supported in position by the devices previously described, a pneumatic insulating-chamber 15 being preferably placed beneath each end of each sub-section, and these sub-sections, in conjunction with the longer sections 20, (which latter may be a mile or more in length,) form a complete track for the trolley or collector. The longer sections may reach from one valley to the next depression or bottom of a declivity along the roadway.

I will now proceed to describe the manner in which the sections and sub-sections of the the bare conductor are connected to the main supply-conductor, when a road having a sectionalized bare conductor is used. This connection is accomplished by novel magneto-electric contacting appliances placed in "pneumatic boxes," the covers of which are designated by the numeral 24, and which are located at or near the points in the road at which the sub-sections 22 are fixed. These boxes consist of a base-plate 25 and vertical side walls 26, formed integral, and said side walls being set back from the edge of said base-plate a proper distance to form a peripheral flange therearound, against which the lower end of cover 24 is adapted to come in close contact when said cover is in place on the box. The cover 24 is cast-iron, preferably, and has such weight as will be greater than a bulk of water equal to its internal capacity to prevent its floating off in case of flooding, and it is also in the form of a diving-bell, having an imperforate air-tight upper end and freely-open lower extremity and being of such size as to telescope over the vertical walls 26 of the box. It has a roughened upper surface to prevent slipping of the feet of animals walking thereupon, and hand-holds 27, formed therein, by means of which it may be conveniently lifted off when occasion requires. The exterior form of such a box may be rectangular, as here shown, or it may be cylindrical, or of other shape, the base portion being fixed and immovable and the cover being removable, as before stated. Hence such a cover will act as a pneumatic insulator of water, capable of absolutely preventing access of water from above or below into the cavity of the box, and will therefore protect the magneto-electrical devices and their contacts contained within said cavity. It should, of course, be removable and normally located in a vertical position, to the end that the pneumatic principle may be sustained, which will readily occur to the operator and need not be further dwelt upon. Each box contains two double-coil electro-magnets 28, each of which has an armature 29 fixed upon and extending at right angles to a pivoted bar 30, but insulated therefrom, and said bar being pivoted at one end to a vertical conducting-piece 31, fixed within the box to one of the vertical sides thereof and insulated therefrom, (see Figs. 5, 6, and 8,) and the end of the pivoted bar that is opposite its pivoted end being adapted to contact with a fixed contact-piece 32 in electrical continuity with the forward or nearest end of the longer section 20, that is nearest to said contact-piece, such connection being made by way of the feed-wires 21, which are made to enter the box through perforations made in the base 25 thereof. The apertures through which these feed-wires pass, and through which all other wires or connections pass, made in the base 25, and which are hereinafter mentioned, are properly packed or plugged around said wires to make a water-tight joint and prevent entrance of water or moisture into the box.

For clearness I will designate the longer and sub sections $a$ $b$ $c$ $d$, &c., in Figs. 10 and 11, beginning with $a$ at the right hand of Fig. 10 and reading toward the left hand of said figure. $a$ indicates the nearest end of the nearest longer section 20, to which the contact 32 above mentioned, is connected. 33 is an insulated feed-wire, leading from the main conductor direct to the box or, as shown in Fig. 9, leading from the switch of my hydraulic cut-out to said box and entering the bottom thereof near the center of its length, where it is divided into two branches or loops, each of which includes the coils of one magnet 28. One terminal of each magnet is connected to this feed-wire 33, as just stated, and the other terminal of each magnet is connected to a conductor 34, leading to the nearest short or sub sections, (marked $b$ and $c$ in Fig. 10,) and, further, within the box a branch or loop 35 of each of the last-named terminals of the magnets is made to include a metallic spring 36 and the conducting-piece 31, and consequently the pivoted bar 30, said spring acting in opposition to the magnet with which it is connected to normally hold said bar 30 out of contact with the fixed contact 32. At intervals along the roadway these boxes (containing duplicates of the electro-mechanical devices just described) are placed, as are also duplicate sub-sections and electrical connections, and as the construction and connections of each are the same I do not deem it necessary to further describe such.

The collecting device which I employ may be in the form of a sliding brush, or it may be in the form of a wheeled trolley having one or more wheels adapted to travel upon the bare conductor and sections or sub-sections thereof.

One form of trolley which I prefer is that shown in Figs. 1 and 4, wherein the numeral 23 indicates two wheels having in the periphery of each a V-shaped groove 37, having plain surfaces for its adjacent sides, which sides are adapted to engage the peculiar face of the bare conductor, before described, and in passing across the terminal spaces between the sections avoid any abrupt contact with the next section and also obviate any break in the current flowing between the sections and between the sections and the trolley-wheel. The two wheels 23 23 are connected electrically and mechanically by a horizontal bar 38, having a fork at its opposite ends, in which said wheels are mounted to revolve freely. A vertical shank 39 is pivotally attached at its lower end to the bar 38 intermediate of the two wheels aforesaid and extends upwardly a suitable distance to connect with the vehicle at a point above the slot-rails. The shank 39 is made sufficiently thin to pass up through the slot, but is quite wide in the direction of movement of the vehicle, and where frictional contact with the sides of the slot is liable to be made it is provided with an incasing sheath of metal 40, having a flared open lower end and a screw-threaded upper end closed by a cap 41. Said cap has a central perforation through which said shank passes, and it is provided with an arm 42, which is to be mechanically connected to the vehicle. A conductor 43 connects with the upper end of shank 39 and conducts current to the motor. The shell 40 is filled with an insulating material down to within such a distance from its lower end as will prevent upward film conduction when it is covered with water, and said insulating material also passes upward into the cap and surrounds and completely fills the space between the shank, the cap, and the conductor 43, making the upper end of said shell practically imperforate and air and water tight. Surrounding said shell 40, on a line beneath the slot-rails, is an annular cup 44, having its upper end imperforate and its lower end open to the atmosphere, the purpose of which will appear farther on. It should be clear that the cap 41 may turn or rock upon the shell 40, which may be accomplished as I here show it, or any other bearing between said shell and said cap which will permit the cap to turn upon the shell may be employed, or the cap and shell may be fixed together and the arm 42 and conductor 43 be made flexible, so as to permit lateral movement thereof during operation upon the car. Thus it will be seen I provide the trolley with a vertical shank pivoted to it and having movement only in a vertical plane below the slot-rails within the conduit and with an arm having lateral movement only above the slot and outside the conduit, and that the two movements combined will be equivalent to a universal joint, permitting upward and downward and lateral movement of the arm 42 and the conductor carried thereby.

In some cases I may dispense with one wheel of the trolley and make use of the form shown in Fig. 2, wherein the shank 39 is mounted directly upon the axle of the wheel 23, such construction permitting the same movements of the arm 42 as it would have in the two-wheeled trolley just above described, as will readily be understood.

45 indicates the removable covers for man-holes arranged at proper points along the roadway for permitting access to the parts beneath the surface.

46 in Fig. 10 indicates a fuse-box of ordinary well-known construction, one of which may be placed in each shunt between the main conductor and the bare conductor, as may be deemed necessary.

My hydraulic cut-out comprises a float 47, located in a chamber, as 48, in which water is adapted to rise during a flood, the same being connected with the conduit 10 by means of a passage 49, or said float may be arranged directly in said conduit in such a manner that when water rises very nearly as high therein as the line 50, upon which the bare conductor may be located, said float will rise, as indicated by dotted lines in Fig. 9, and automatically cut out the section or sections of bare conductor which are located adjacent to the flooded portion of the roadway. Said float is attached to the free end of an arm 51, which is pivoted to any suitable support, such as 52, so as to permit the float to rise and fall freely, and thereby actuate a suitable switch 53, for the purpose above mentioned. This switch, preferably, has the construction which I have described and shown in my United States patent, No. 451,815, granted to me May 5, 1891, for conduit system of electric railway, the same having an outer case or covering adapted to be rocked or rotated, and to which further reference will be made. I do not deem it necessary to further show or describe the construction of this switch, therefore, as such is clearly set forth in my patent aforesaid.

The switch 53 is to be located in a suitable chamber beneath the roadway and have its terminal 54 connected to the main conductor 1 and another terminal connected with conductor 33, leading by way of one of the before-described pneumatic boxes to the section or sections of bare conductor which are to be cut out in case of flooding.

55 indicates a segmental gear (or a series of gear-teeth) formed upon the outer shell of the switch 53, the teeth of which gear are engaged by the teeth of a toothed segment 56, formed upon or attached to the lever or arm 51, so that when said arm is raised or lowered said outer shell of the switch will be rocked or rotated and contact will be made or broken (as the case may be) within said shell, as fully stated in my patent above mentioned, whereby the section or sections to which the hydraulic cut-out is or may be applied will be cut out of circuit with the main conductor or thrown in, as may be required. Of course it is evident that said hydraulic cut-out may be interposed in the shunt directly between the section or sections of the bare conductor and the main conductor, omitting the pneumatic box in case the short sub-sections 22 are not used in the line.

The operation is as follows: The bare conductor (also the short subsections thereof) is used as a rail for the trolley and as a contact for establishing circuit with the main conductor, as will be explained farther on. The wheel (or wheels) 23 of the trolley will run quite smoothly over the spaces between the ends of the sections and sub-sections, for the reason that the apexial line of the extreme upper surface of said sections and sub-sections is never contacted by the inner periphery of the V-shaped groove in said wheels, the relative angular location of the two opposite faces of said grooves being so much more acute than the sloping sides of the face of said sections or sub-sections. (See Figs. 4 and 9.) The ends of the sections, being correspondingly beveled or inclined, (see Fig. 2,) form a "lap-joint," which I have found also obviates in a great degree any sudden "bumping" of the trolley-wheels in passing from one section to another, because with such construction there is always a portion of material beneath said wheels at the usual point of contact in their outer peripheries, as contradistinguished from the usual construction of joints between sections, in which the ends are cut off abruptly and in which they clear a vertical space between the adjacent ends, and no material will be located beneath the wheels for a short space of time during which they are passing from one section to another.

Reference should now be had to Figs. 10 and 11, in which the numeral 60 indicates the motor carried by the car, and in which the several successive positions of the car and its trolley are shown during the passage of the trolley from one longer section $a$ (at right hand of Fig. 10) over two of the sub-sections and until it reaches and rests upon the next longer section $s$ of the bare conductor. (See left hand of Fig. 11.) Circuit with a dynamo is first established through a longer section $a$, above mentioned, which is to be in permanent electrical continuity with said dynamo located at the power-station or other starting-point, or by any suitable manual switch, and the trolley travels along the section $a$, so connected, through the first sub-section $b$, as shown at the right hand of Fig. 10. When the trolley passes upon the sub-section $b$, current passes from the main conductor 1, passes to the magnet 28, located in the pneumatic switch-box, thence through conductor 34 to said sub-section $b$, also connected, spring 36, conducting-piece 31, and the pivoted bar 30. Said magnets being now excited, their armatures are attracted, and said bar 30 makes contact with fixed contact 32 and through conductor 21 to the section $a$, which the trolley is about to leave, the circuit with the motor 60 remaining complete through the sub-section $b$. An instant later the trolley or collecting device has passed onto the next succeeding sub-section $c$, and current is supplied to the motor through it, the successive longer section $d$ standing already connected and ready for the trolley to pass to it. (See position of trolley at left hand of Fig. 10.) Still, a moment later, after the trolley-wheel has contacted with the longer section (see the central portion of Fig. 11, in which said section is marked $p$) the motor-current passes through the magnet which is located in the left-hand end of the pneumatic box and in a manner just above described, but no longer through the first sub-section, because its magnet has been cut out and its spring 36 has forced its armature to its normal position and the pivoted bar 30 out of contact with the fixed contact 32; but no current passes through the sub-section $c$ after the trolley has departed from it. The trolley pursues its way along the said long section to the next sub-section in advance. Meanwhile the motor-circuit is through the magnet and contact continuous with the long section over which it is traveling, and so on to the end of the road. The motor-circuit is maintained, therefore, only by reason of successive magnets and sub-sections being thrown into said circuit, and a current through the fields of the motor depends, essentially, upon the permanency of the contacts made between the pivoted bars 30 and their permanent contacts 32, which will be interrupted when the vehicle is brought to a standstill by means of the usual rheostat. Therefore it is imperative that current shall continuously pass through the section or sub-section upon which the trolley is located. To accomplish this, upon each vehicle I locate a shunt 61 around the motor and include in this shunt-circuit a series of lamps at night and a resistance-coil 62 in the day-time, a suitable switch 63 being provided in said circuit for the purpose of throwing in or cutting out either the lamps or the resistance-coil. (See Fig. 10.) Thus when the motor is cut out of circuit, as in stopping the car, an adequate current will always pass through the coils of the magnets before mentioned.

In detailing the action of the trolley with regard to the section and sub-sections, I will recapitulate its behavior when provided with one wheel and two wheels separately and respectively. With a two-wheeled trolley the distance between the wheels must always be less than the length of the sub-sections 22. When the trolley is at any point on a long section, it is supplied with current through the magnet and its sub-section adjacent to it and in its rear, depending upon the direction in which said trolley is moving. When the trolley is wholly upon the first sub-section $b$, it receives current wholly through said sub-section, and the section or sub-section which it just departed from remains only connected unless another car is in motion upon it. When the trolley is astride the interspace between two sub-sections, it derives current through both of said sub-sections, the railway-sections still remaining connected and the forward sections becoming so likewise as soon as its magnet is excited. When the trolley passes wholly upon the sub-section $c$, it derives current exclusively from this sub-section. In the action of this trolley it will be perceived that circuit with the dynamo is always established through the motor by and through the forward wheel of the trolley before circuit is broken by the rearward wheel thereof. Hence the continuity of the current through the motor of a moving car is unbroken and all stops and irregularities are prevented. Moreover, as the contacts in the pneumatic boxes are never broken as long as current passes through them, it is obvious that there can be no sparking in the boxes. One magnet is cut out by the act of throwing in another.

When a trolley with one wheel is employed, its relation to the circuits successively made and interrupted will not be materially different. As the trolley-wheel moves in contact with the sides of a peculiarly-shaped bare conductor (previously described) the wheel makes contact with an adjacent sub-section or section before it actually breaks contact with another, and therefore the circuit is practically never broken by the wheels of the trolleys. Hence when such a trolley is passing over a section it is supplied with current through the rearward or proximal magnet and connections in whose circuit it is moving, and when it passes to the proximal sub-sections it is supplied with current exclusively through the said sub-section, leaving the proximal sections polarized, and so on, as before stated. By the use of the pneumatic chambers 15 the insulating material located therein is always kept dry, as it is sheltered from rain and all water falling from above and from all water rising from below by the elastic resistance of the air contained in said chambers, whose open mouths are below at a sufficient distance from the insulating material to prevent wetting thereof by succussion, waves, spurting, or turbulence of the water. The upper portion of the inside of said chambers and insulation which they inclose will thus always be dry, and any route of conduction by a film of water covering and wetting the bare conductor, the exterior of the chambers, and the tubes supporting them is thus interrupted and the film is cut off, or, at most, ceases at a point an inch or so above the lower open ends of said chambers, so that the tubes or rods supporting the chambers and passing up into them, though they may be wet at their lower portions by rain or otherwise, must nevertheless be dry at their upper portions, and thus prevent conduction of electricity from the section of conductors to the framework of the road at all times.

It will be noticed that by reason of the duplication of electro mechanical devices in each of the "pneumatic switch-boxes" and their connections with the sections and sub-sections the vehicles running upon the road may readily move in either direction.

To obviate the effects of a rush of water through the conduit 10, I provide at intervals therein cross-walls, such as 90, which divide said conduit into a series of sections, each having a lateral drain—such as 12—leading therefrom to a sewer or other suitable receptacle. These cross-walls will not at all be in the way of movement of the trolley, as they are located below the path of same and will confine floodings to small localities. (See Fig. 4.)

I do not limit myself to the exact details of construction which I here show for the several purposes mentioned, as it is obvious that such changes in the same as would occur to a mechanic skilled in the art of electric-railway construction may be made without departing from the scope of my invention.

Having thus described the nature of my invention and one operative manner of carrying it out, what I claim is—

1. In a conduit electric railway, the combination of a main insulated conductor located in or adjacent to a conduit, sections and sub-sections of bare conductor also located in a conduit, a current-collector, such as a wheeled trolley, adapted to travel on the sections of bare conductor, a hydraulic cut-out having a float arranged to rise and fall when a body of water collects in said conduit, a switch arranged to be actuated by said float and to cut out said sub-sections when said float rises, a water and moisture proof switch-box, and electro-mechanical devices located in said switch-box in the line between said switch and said sub-sections and adapted to throw in and cut out said sections and sub-sections of bare conductor upon passage of the current-collector thereover, substantially as specified.

2. In a conduit electric railway, a pneumatic chamber consisting of a shell having an upper portion impermeable to water or air and a lower end open to the atmosphere, a body of insulating material located in the upper portion of said chamber at a distance from the open end thereof, and a vertical supporting-pin upon which the body of insulating material is mounted, in combination with a main insulated conductor and a bare conductor, between which said pneumatic chamber is located, and a conducting-wire passing from the main conductor up through the pneumatic chamber to the bare conductor, substantially as specified.

3. In a conduit electric railway, a main conductor, a series of pneumatic chambers containing bodies of insulating material within their upper ends, sections and sub-sections of bare conductor in circuit with said main conductor at times, said sub-sections and sections being mounted upon the exterior of said pneumatic chambers, and a series of pins or tubes upon the upper ends of which the several bodies of insulating material within said pneumatic chambers are mounted, and a conducting-wire passing from the main conductor up through the pneumatic chamber to the bare conductor, substantially as specified.

4. In a conduit electric railway, a pneumatic chamber comprising a suitable shell closed at the top and open at the bottom, a body of insulating material in the upper portion of said chamber, a suitable base, as 14, a vertical pin, a tube supported on said base and carrying upon its upper end the body of insulating material, a main conductor below said chamber, and a sectional conductor supported on the top thereof, and a conducting-wire, as 21, passing from the main conductor up through said tube and pneumatic chamber and connecting with the bare conductor, substantially as described.

5. In an electric-railway system comprising a main insulated conductor and sectional bare conductors, a conduit composed of upper and lower chambers for the respective conductors, the lower chamber having cross-walls 90, with drain-pipes leading therefrom, and pneumatic chambers supported in the lower chamber and passing up into the upper chamber and supporting the bare conductors upon their upper ends, substantially as described.

6. In an electric railway, a main insulated conductor, a bare conductor supported above the same and in electrical connection therewith, a lower conduit for the main conductor, an upper conduit for the bare conductor, and pneumatic insulating-chambers interposed between the main and bare conductors supported in the lower conduit, but extending into the upper conduit and supporting from its upper end the bare conductor, substantially as described.

7. In an electric-railway system, a main insulated conductor, a sectional bare conductor composed of one long and two short sections alternately, suitable connections between the main and sectional conductors, and switches between the same under the control of the moving vehicle, substantially as described.

In testimony whereof I affix my signature in presence of two witnesses.

WILLIAM H. FORD.

Witnesses:
C. K. JONES,
JNO. C. HIGDON.